Dec. 10, 1957 F. M. RIVES ET AL 2,815,869

COMPONENT CARRIER

Filed March 21, 1955 3 Sheets-Sheet 1

INVENTORS:
FRANK M. RIVES,
EARL W. SIEGEL,
THOMAS W. ZEBLEY,
CHARLES J. GODWIN,
MICHAEL G. BERIGAN,

BY George R. Ritzroth
THEIR ATTORNEY.

INVENTORS:
FRANK M. RIVES,
EARL W. SIEGEL,
THOMAS W. ZEBLEY,
CHARLES J. GODWIN,
MICHAEL G. BERIGAN,
BY George [signature]
THEIR ATTORNEY.

COMPONENT CARRIER

INVENTORS:
FRANK M. RIVES,
EARL W. SIEGEL,
THOMAS W. ZEBLEY,
CHARLES J. GODWIN,
MICHAEL G. BERIGAN,

BY [signature]
THEIR ATTORNEY.

United States Patent Office 2,815,869

Patented Dec. 10, 1957

2,815,869

COMPONENT CARRIER

Frank M. Rives, Syracuse, Michael G. Berigan, Schenectady, Charles J. Godwin and Earl W. Siegel, Ithaca, and Thomas W. Zebley, Schenectady, N. Y., assignors to General Electric Company, a corporation of New York Application March 21, 1955, Serial No. 495,638

15 Claims. (Cl. 214—1)

Figure 1:
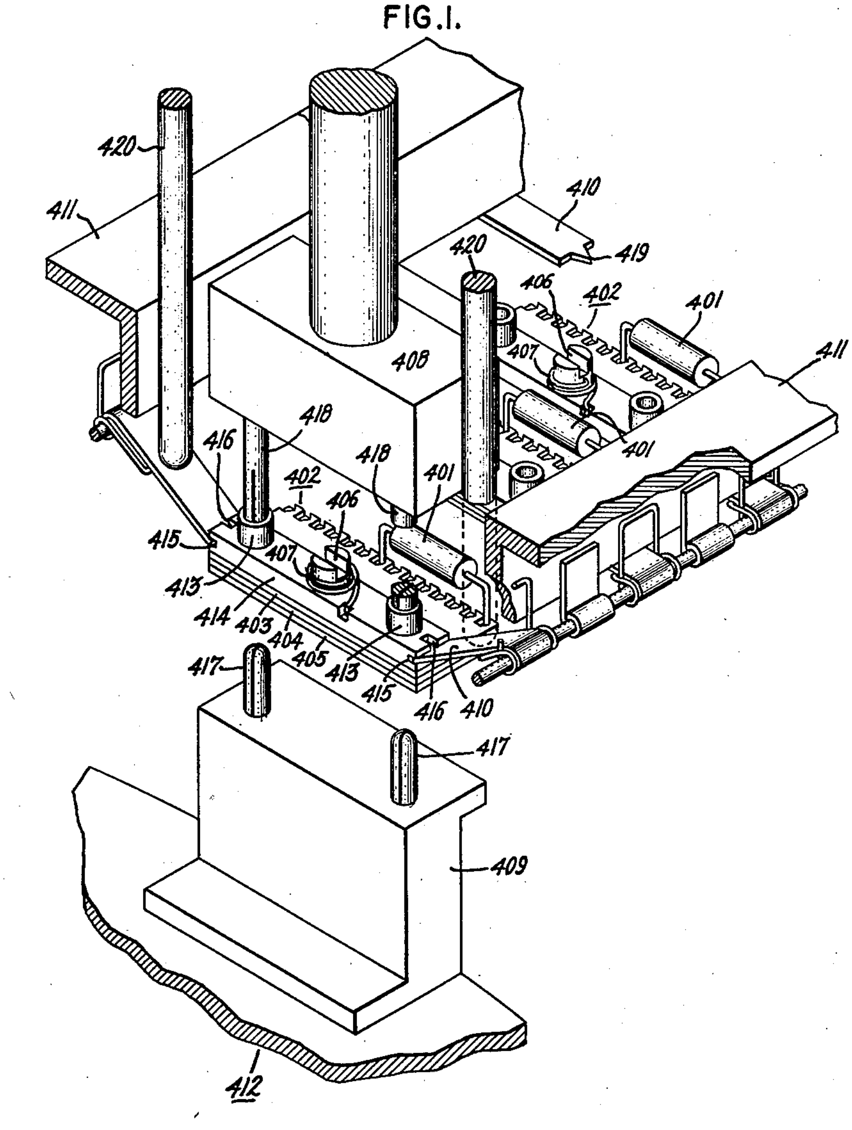

The present invention relates to systems for the assembly of leaded electrical components into circuit matrices and deals particularly with a carrier adapted to facilitate the handling of leaded electrical components of many sizes and configurations in the process of assembly. The component carrier, which is the subject of the present invention, finds application in such a system as that disclosed in co-pending application, Serial Number 495,682, filed March 21, 1955, entitled "Component Assembly System," filed on behalf of Charles J. Godwin et al. and assigned to the assignee of the present invention.

The problem of mechanizing the assembly of leaded electrical components into circuit matrices has been an extremely difficult one, and a satisfactory solution has not been known hitherto. The mechanization of the assembly processes has taken several forward steps in regard to designing mounts for receiving leaded components and in preparing the leaded components for insertion into prepared mounts, and in the final step of soldering the components in their circuit connectors, once they have been placed. However, the actual step of picking up the component and placing it into the desired circuit connector has resisted mechanization and is still generally performed manually.

The mechanization of the placement operation requires that there be considerable flexibility on the part of the apparatus handling the component while at the same time considerable accuracy in the positioning of the leads. The handling operation must be capable of accepting many kinds of electrical components. These electrical components may be cylindrical, rectangular or of generally flat disc-like shape. They come in many sizes ranging from less than one-half of an inch in length to lengths exceeding two inches. In addition, they may have two, three or more connecting leads. The requirements for the handling of the leads themselves are extremely stringent since the connector apertures adapted to receive the leads are often little larger than the lead diameters. In the arrangement here described, the divergent demands are satisfied by a carrier, which intermediately receives and holds the component until it is ready for placement and which lends itself to convenient and precise performance of the placement operation. Likewise, the carrier is adapted to satisfy similar requirements at other steps of assembly, such as preliminary electrical testing.

In general, the requirements for such a carrier may be summed up as follows. The device should carry the component regardless of its size or configuration and should be able to fix the location of the component leads, regardless of number, with respect to some reference position upon the carrying device. The carrying device should also be adapted to readily accept the component when loading is desired, and be adapted to readily discharge the component. The component carrier per se should admit of free transfer from apparatus to apparatus. It is accordingly an object of the present invention to provide a component carrier which satisfies these requirements.

It is another object of the present invention to provide a carrier for leaded electrical components suitable for use in the assembly of electrical components into circuit matrices.

It is a further object of the present invention to provide a carrier for leaded electrical components of varying sizes.

It is still another object of the present invention to provide a carrier for leaded electrical components of differing configurations.

It is still another object of the present invention to provide a carrier for leaded electrical components having differing numbers of connecting leads.

These and other objects are achieved in a carrier for handling leaded electrical components which comprises a plurality of spaced pairs of jaws mounted upon a common frame member. Each of these pairs of jaws which may be preferably spaced from each other in modular fashion is adapted to open for reception of a component lead and to close tightly about a component lead for retention thereof. The component carrier further includes a jaw actuator adapted to open and close said pairs of jaws and may further include biasing means tending to retain such pairs of jaws in closed position. Actuating means are further provided for causing each of the jaws to open to the same extent and thus retaining the center of the component lead at the same distance longitudinally along the frame, regardless of the diameter of the connecting lead.

In accordance with another aspect of the invention, means are provided for self-centering the component lead transversely with respect to the frame member regardless of lead diameter, these means comprising tapered or triangular indentations, having sides tapered at equal angles on the gripping surfaces of the component jaws.

In accordance with another aspect of the present invention simplified means are provided for construction of the pairs of jaws from a relatively small number of toothed plates having regularly spaced teeth, each forming a portion of individual jaws.

In accordance with still another aspect of the present invention, means for freely transferring the component carrier from apparatus to apparatus are provided, said means comprising an orifice open at both ends adapted to frictionally engage a transfer member thrust therein from either end and further adapted to permit the entry of one transfer member to sufficient depth to cause the disengagement of another like transfer member previously inserted in said orifice from the other end. A third handling surface is provided permitting the disengagement of said carrier from transfer means of the sort referred to above.

Figures 2A, 2B, 2C:
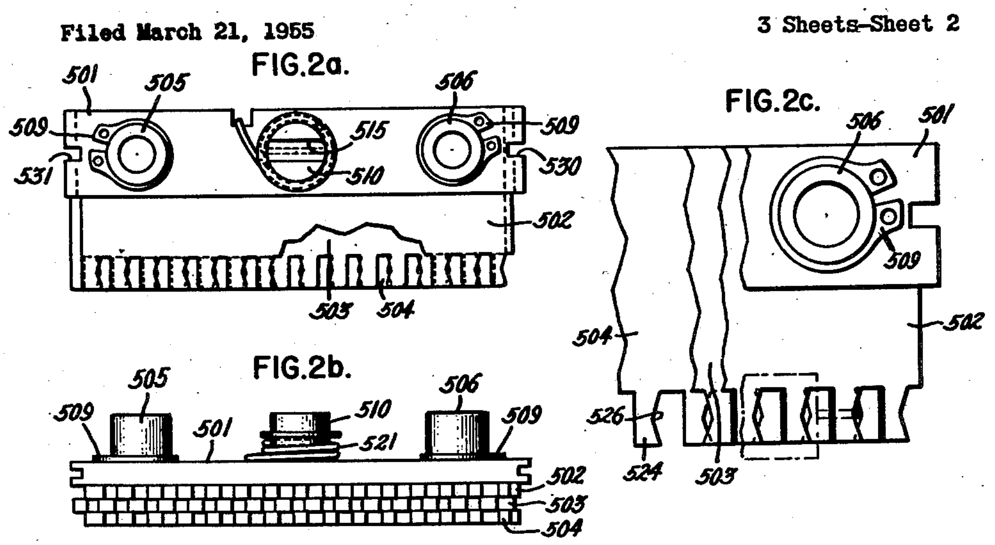
Figure 3:
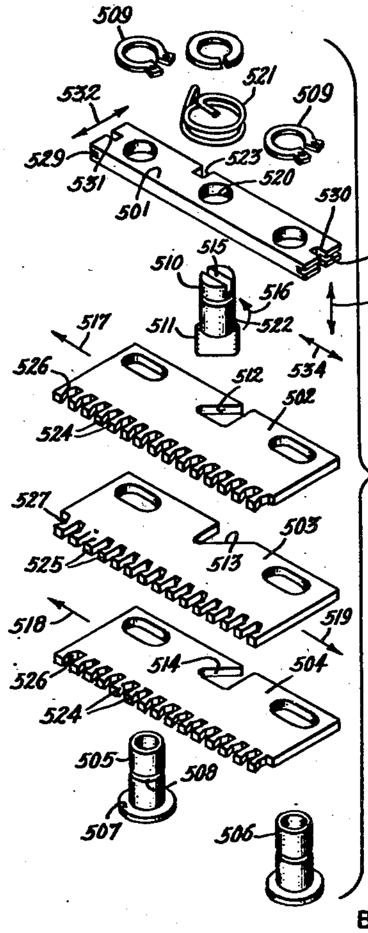
Figure 4:
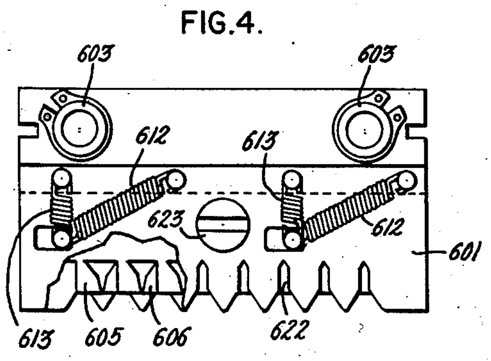
Figure 5:
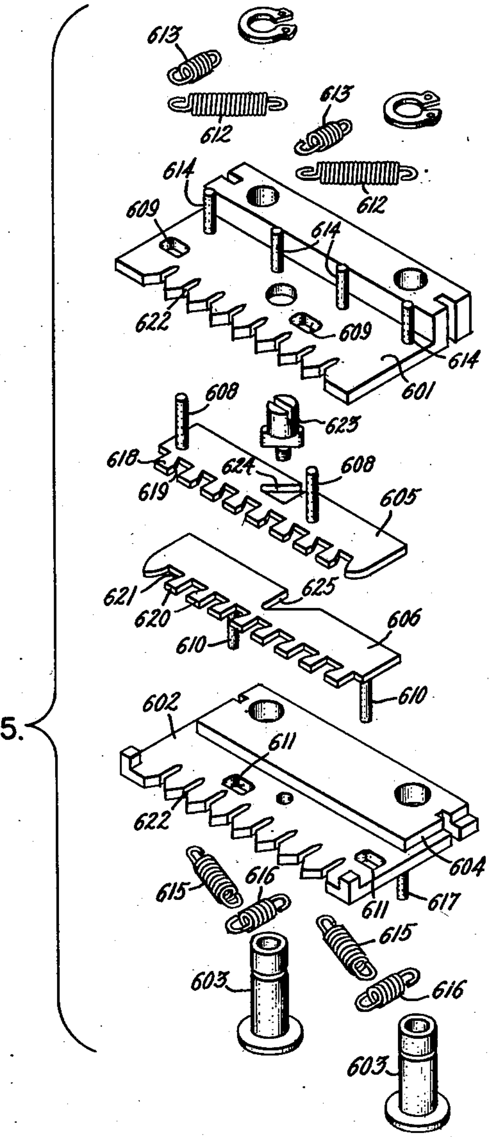

The novel features which are characteristic of the invention are set forth with greater particularity in the appended claims. Representative embodiments of the invention are further described, however, both as in their organization and method of operation, together with further objects and advantages pertaining thereto, in the following text, taken in connection with the accompanying drawings in which:

Figure 1 illustrates in perspective, a component carrier and a portion of an assembly system. The figure illustrates the manner in which the component carrier may be employed;

Figures 2*a*, 2*b*, 2*c* and 3 illustrate a first embodiment of the component carrier; Figure 2*a* is a plan view, Figure 2*b* is a front elevation view, and Figure 2*c* is a partial plan view illustrating the manner in which component leads may be grasped and Figure 3 is an exploded view illustrating the construction of the component carrier; and Figures 4 and 5 show a second embodiment; Figure 4 illustrates a component carrier in plan view while Figure 5 is an exploded view of this component carrier illustrating the construction thereof.

Prior to a detailed consideration of the construction of the component carrier, one may consider the part which the component carrier plays in an assembly system. A portion of such a system is shown in Figure 1. Figure 1 illustrates the manner in which a component is carried by the component carrier, and the manner in which the component carrier facilitates the transfer of a component from one apparatus to another apparatus.

The component is supported in the component carrier by its leads. An axial leaded component 401, which may be a small carbon resistor or a tubular capacitor, is shown in place in a component carrier 402. The leads of the component 401 are shown extending through three adjacent toothed members 403, 404, and 405. These members form the jaws of the component carrier 402. By gripping the leads of the component, they provide support for the component and accurate positioning of the component leads. The outer toothed members 403 and 405 may be displaced laterally with respect to the inner toothed member 404 by means of a cam operating actuator member 406 in order to open the jaws of the component carrier and permit loading or unloading of the carrier. A spring 407, shown encircling the actuator member 406, exerts a biasing force which tends to keep the jaws in closed position, thus tightly gripping the leads of a component held therein. Further details on the construction of the component carrier will be considered in connection with Figures 2 and 3.

The component carrier 402 is shown in the process of transferring a component from a first apparatus, such as a turret for preparing the components, to a magazine for subsequent transfer to a second apparatus, such as a component placement apparatus. In Figure 1, the component 401, in its carrier 402, has just been lifted by the magazine loading head 408 upward from the component supporting stand 409. The component carrier 402 is in initial engagement with the supporting fingers 410 of the component carrier magazine 411. The component supporting stand 409 may be one of a group of supporting stands which are mounted upon a rotating turret 412 and periodically indexed into position under the magazine loading head 408 for the delivery of components to the loading head. The component magazine 411, into which the components are being loaded may then be transferred to a component placement apparatus after it is fully loaded.

Provision for handling of the component carrier in gross is by two portions of the component carrier: the hollow pins or collets 413 attached to the frame member 414 and the slots 415 and 416 at the ends of the frame member 414. The collets 413 are utillized in handling the component at the supporting stands 409 and at the magazine loading head 408. Both the supporting stand and the magazine loading head are provided with cylindrical pins which enter the collets 413 of the component carrier. The pins of both the supporting stand and the loading head may be of split construction, having sectors formed with a slight outward bias in order to provide a firm grip on the inner surfaces of the collets 413 of the component carrier. The pins 417 of the supporting stand 409 are further adapted to recede in an axial or downward direction under the influence of a downward pressure. Biasing means concealed in the stand 409 tend, however, to keep the pins upwardly extended. The pins 418 on the loading head 408 are arranged to depress the pins 417 of the supporting stand for transferring the component from the supporting stand to the loading head.

The slots 415 and 416 provide the means by which the component carrier 402 is supported and positioned in the component carrier magazine 411. The slot 415 is in a horizontal plane, while the slot 416, which is of greater depth than the slot 415, is in a vertical plane. The component carrier magazine 411 is provided with a plurality of flat fingers 410, which extend inwardly from the sides of the magazine 411. The fingers are pivoted at their outer edges, but are urged into a horizontal position by suitable upward biasing means. When the fingers 410 are in horizontal position, they are adapted to support a component carrier by the slots 415 at either end of the carrier, the fingers being spaced apart a distance just slightly larger than the distance separating the bottom surfaces of the slots 415. In order to center the component carrier in the fingers 410, the fingers are each provided with a triangular point 419 which enters the vertical slot 416. Loading and unloading of the carrier from the magazine 411 is achieved by increasing the separation between the inner edges of the fingers 410 to a distance greater than the width of the component carrier. This may be accomplished by depressing the fingers and rotating the tips away from one another. The magazine loading head 408 is provided with a pair of finger depressing plungers 420 which serve to open and close the carrier gripping fingers 410.

Transfer of the component carrier from the turret 412 to the magazine 411 occurs in the following manner. A supporting stand 409 bearing a component carrier on its retractable pins 417 is indexed into position beneath the loading head 408. The loading head 408 moves downward, and its pins 418 enter the collets 413 of the component carrier, forcing the pins 417 of the stand into retracted position, thus freeing the carrier from the stand 409 and transferring it to the loading head 408. The loading head then commences to rise with the carrier. Prior to the time that the carrier has been elevated to the level of the magazine fingers 410, the finger depressing plunger 420 has spread the fingers 410 to the distance necessary to permit the component carrier to enter between the fingers. The fingers 410 are then nested within the slots 415 to grip the component carrier 402. As the loading head 408 continues its upward course, the fingers reach horizontal position, beyond which they cannot go. At this point, they strip the component carrier from the loading head, leaving it in place in the magazine 411.

Figures 2*a*, 2*b* and 2*c* illustrate in detail the construction of a first embodiment of the component carrier. The component carrier is constructed of four insulated members, one of which, the frame member 501, serves as the support for the contact gripping jaws and is also the portion by which the component carrier is manipulated. Supported upon the frame 501 are three cooperating toothed plates, the upper toothed plate 502, the intermediate toothed plate 503 and the lower toothed plate 504. These are supported upon the frame 501 by means of a pair of flanged collets 505 and 506. These collets or sleeves pass through the frame 501 and each of the toothed plates, being provided with a lower flanged portion or collar 507 for retention of the lowermost toothed plate 504 and a slot 508 adapted to receive a snap ring 509 which is adapted to bear against the frame member 501 and secure the assembly. In order to permit relative motion of the toothed members 502, 503, 504 with respect to one another, the perforations through which the collets 505 and 506 pass, are elongated in a direction parallel to the toothed portions to form slots. The transverse dimensions of the slots are only slightly larger than the outer diameter of the collets thus permitting essentially a motion along a single line.

Relative motion between the toothed plates for opening the lead gripping jaws is achieved by manipulation of a centrally disposed actuator 510. It has a projecting tongue 511 at the lower portion thereof whose edges cooperate with mating bearing surfaces on the toothed plates designated respectively as 512, 513, 514 to cause linear relative motion between the toothed plates.

The actuator 510 has a suitable slot 515, whereby the actuator 510 may be caused to rotate by a tongue and slot drive. Rotation of the actuator 510 then causes rotation of the actuator cam 511 against the bearing surfaces 512, 513, and 514. It will be noted that the surfaces 512 and 514 of the uppermost and lowermost toothed plates are of similar shape whereas the bearing surface 513 of the inner toothed plate is of complementary form. Counterclockwise rotation, as indicated by the arrow 516, of the actuator 510 brings the right portion of the tongue into engagement with the bearing surfaces 512 and 514 driving the toothed plates 502 and 504 to the left in a direction indicated by the arrows 517 and 518. At the same time the left hand edge of the cam 511 engages the bearing surface 513 of the middle toothed plate 503. Counter-clock-wise motion of the actuator 510 thus causes the plate 503 to move to the right as indicated by the arrow 519. In this manner the upper and lower toothed plates are caused to slide together in opposition to a similar but oppositely directed sliding motion on the part of the central toothed plate 503. This construction prevents translation of the centers of leads of differing diameters longitudinally along the frame when the surfaces 512 and 514 present equal angles to the plane of the cam 511, i. e. the surfaces 512 and 514 are parallel. The actuator 510 is retained upon the frame member by the tongue 511, both of whose edges extend outwardly of the diameter of the upper portion of the actuator. The actuator 510 is then fitted into the frame member 501 through a centrally disposed aperture 520 of approximately the same diameter as the upper portion of the actuator. In order to maintain the teeth in a closed position, a biasing spring 521 is provided, having one end fastened in a hole 522 in the upper portion of the actuator, and the other end fitted into a slot 523 on the frame.

Components are grasped in the component carrier by means of the toothed plates 502, 503 and 504, which are shaped to form lead gripping jaws. The teeth in each member are of regular shape and are placed at regular intervals along the edge of the plate. The teeth are of generally rectangular shape having pointed or triangular indentations on one lateral edge surface. The teeth 524 of the toothed plates 502 and 504 have their indented surfaces 526 on the right lateral edge surfaces of the teeth whereas the indented surfaces 527 of the teeth 525 of the middle toothed plate 503 are placed on the left lateral edges of the teeth. When the teeth are properly displaced for reception of a component, upper and lower toothed plates have been translated with respect to the central plate so that a plurality of similarly shaped apertures are formed, one aperture being formed by each set of three teeth. The shape of the aperture in fully opened position is that of a hexagon with one side missing with the indented portions of the teeth forming the four sides of each aperture. After the component has been inserted into the jaws, the toothed plates may be released to a closed position. In this position the indented surfaces of the jaws form closed diamond shaped apertures about the leads.

The component carrier described has many advantages. Loading and unloading of the component may be conveniently accomplished by the actuator 510 which opens and closes the teeth 524 and 525. Grasping the component by the leads is an advantageous manner of supporting the component in the subsequent placement of the component. Since it is usually desired to place each of the leads into holes of previously specified position, it is extremely desirable to have an accurate way of determining the position of the leads. The component carrier which supports the component by its leads provides such a mechanism. Since components may be of different sizes, a plurality of jaws having differing separations are provided so that most common sizes of components may be readily accommodated. The use of an insulating material for the toothed plates permits the component to be retained in the carrier through many types of processing, including electrical testing.

The component carrier is provided with a pair of handling portions for manipulation of the carrier in gross. These portions were discussed in some detail in connection with Figure 1. They are respectively the collets 505 and 506 which are supported upon the frame 501 and the slots 528, 529, 530 and 531 at the ends of the frame member 501. The slots 528 and 530 form a cross as do the slots 529 and 531 to provide accurate positioning of the component carrier in all three axes. The vertical slots 530 and 531 which are deeper than the horizontal slots 528 and 529 provide a position defining surface along an axis indicated by the arrow 532 while the slots 528 and 529 provide accurate positioning along the axis indicated at 533. The inner surfaces of the slots 528 and 529 provide accurate positioning of the carrier with respect to the axis indicated at 534.

An alternative form of component carrier is illustrated in Figures 4 and 5. In Figure 5 the frame comprises a pair of members 601 and 602 which are fastened together in spaced parallel alignment by means of tubular pins 603. Separation between the frame members 601 and 602 is provided by spacer members 604. A pair of toothed members 605 and 606 are provided adapted to move within the space between the frame members. The upper toothed member 605 is also provided with a pair of upwardly extending pins 608, which are adapted to pass through slots 609 on the upper frame member 601. The slot 609 is elongated along the direction parallel to the line of the teeth, and has a transverse dimension substantially larger than the diameter of the pins 608 so as to permit some motion of the teeth transverse to the axis of the slot as well as motion along the axis of the slot. Similarly, the lower toothed member 606 is provided with pins 609 adapted to extend downwardly through the slots 611 in the lower frame member 602. The dimensions of the slots 611 are similar to those of the slot 609. Toothed members 605 and 606 are adapted to slide within the space between the members 601 and 602. Tension springs 612, 613 are connected between pins 608 and pins 614, fixed upon the upper frame member, urging the toothed member 605 to bear against the surfaces presented by the long spacer member 604. Similarly the springs 615 and 616 are stretched between the downwardly extending pins 610 of the lower toothed member 606 and pins 617, fastened upon the frame member 602. The main thrust against the spacer 604 is provided by the springs 613 and 616 while the axial thrust is provided by the springs 612 and 615. The axial thrust springs 612 and 615 are oriented to draw the toothed members into a relatively closed position.

The toothed members 605 and 606 are provided with a plurality of generally rectangular teeth. The teeth 618 of the member 605 contain indentations 619 on the right-hand side of the teeth. The teeth 620 of the toothed member 606 are likewise generally rectangular, being provided with indentations shown at 621 extending to the left. The members 605 and 606 thus provide tapered surfaces for grasping a component. In order to provide for accurate placement of the component leads regardless of lead diameter, the frame members are also provided with a plurality of slots 622. These slots 622 have edges leading to a triangular point which insures accurate placement of the component leads, regardless of minor misalignments of the toothed members 605 and 606.

Operation of the toothed members from open to closed position is provided by means of the slotted tongue actuator 623 which is adapted to cooperate with cam bearing surfaces 624 and 625 formed respectively on the toothed members 605 and 606.

The arrangement in Figure 5 has the advantage that components of varying lead diameters may be more securely held by the component carrier. This feature is provided by permitting the toothed members 605 and 606 to move both axially and transversely in the slot formed in the frame with the tensioning springs 612, 613, 615 and 616 forcing the indented surfaces 621 into engagement with both the larger and the smaller diameter component leads. The other portions of the component carrier illustrated in Figures 4 and 5 which cooperate with the external handling apparatus may be similar to those employed in the component carrier illustrated in Figures 2 and 3 and need not be discussed further.

The specific embodiments of the present invention which have been disclosed, provide means for handling leaded electrical components of many sizes and configurations and of differing numbers of connecting leads. Both embodiments provide a self-centering feature whereby the centers of the component leads retain the same position longitudinally with respect to the frame regardless of diameter. The embodiment shown in Figures 2 and 3, which employs jaws having triangular or tapered indentations, fix the center position of the leads both laterally and at directions transverse thereto. The embodiment shown in Figures 4 and 5 provides means for tightly grasping a component having two leads of differing diameters. Both of the component carriers grip the leads near the point at which they will be subsequently inserted into waiting circuit matrices and so provide for accurate placement of the leads.

While particular embodiments of this invention have been shown and described, it will, of course, be apparent that various modifications may be made without departing from the invention. Therefore, by the appended claims it is intended to cover all such changes and modifications as fall within the true spirit and scope of the present invention.

What we claim as new and desire to secure by Letters Patent of the United States is:

1. A carrier for handling leaded electrical components of differing sizes and configurations comprising a frame, a plurality of spaced pairs of jaws mounted upon said frame, each jaw of said pairs being movable with respect to said frame to open for reception of a component lead and to close tightly about a component lead for retention thereof, a jaw actuator supported upon said frame mechanically coupled to each of said jaws for opening and closing said pairs of jaws, and biasing means tending to close said pairs of jaws.

2. A carrier for handling leaded electrical components of differing sizes and configurations comprising a frame, a plurality of spaced pairs of jaws mounted upon said frame, each of said pairs being adapted to open for reception of a component lead and to close tightly about a component lead for retention thereof, a jaw actuator supported upon said frame and mechanically coupled to the corresponding jaws on one side of each pair of jaws through the same mechanical ratio as the mechanical coupling to the corresponding jaws on the other side of each pair of jaws.

3. A carrier for handling leaded electrical components of differing sizes and configurations comprising a frame, a plurality of spaced pairs of jaws mounted upon said frame, each of said pairs being adapted to open for reception of a component lead and to close tightly about a lead for retention thereof, the corresponding jaws on one side of each of said pairs of jaws being formed of two parallel members, spaced apart, and movably supported upon said frame with the corresponding jaws on the other side of each of said pairs of jaws being formed by a single member movably supported upon said frame and adapted to move in the space between said first two recited members, a jaw actuator supported upon said frame mechanically coupled to said three jaw forming members for opening and closing said pairs of jaws, and biasing means tending to close said pairs of jaws.

4. A carrier for handling leaded electrical components of differing sizes and configurations comprising a frame, a plurality of regularly spaced pairs of jaws mounted upon said frame, each of said pairs being adapted to open for reception of a component lead and to close tightly about a component lead for retention thereof, the corresponding jaws on one side of all of said pairs of jaws being comprised of a plate containing a plurality of regularly spaced teeth and the corresponding jaws on the other side of all of said pairs of jaws being comprised of a plate containing a plurality of regularly spaced teeth, each of said plates being movably supported upon said frame and a jaw actuator supported upon said frame mechanically coupled to each of said plates for opening and closing said pairs of jaws.

5. A carrier for handling leaded electrical components of differing sizes and configurations comprising a frame having regularly spaced tapered indentations along one edge, a plurality of regularly spaced pairs of jaws mounted upon said frame, each jaw of said pairs being movable with respect to said frame to open for reception of a component lead and to close upon a component lead forcing it against one of said indentations for retention thereof, and a jaw actuator supported upon said frame mechanically coupled to each of said jaws for opening and closing said pairs of jaws.

6. A carrier for handling leaded electrical components of differing sizes and configurations comprising a frame having regularly spaced tapered indentations along one edge, a plurality of regularly spaced pairs of jaws mounted upon said frame, each of said pairs being adapted to open for reception of a component lead and to close upon a component lead forcing it against one of said indentations for retention thereof, the corresponding jaws on one side of all of said pairs of jaws being comprised of a plate containing a plurality of regularly spaced teeth and the corresponding jaws on the other side of all of said pairs of jaws being comprised of a plate containing a plurality of regularly spaced teeth, each of said plates being movably supported upon said frame and at least one of said toothed plates being adapted to move with two degrees of freedom in a plane, biasing means tending to constrain said last recited toothed plate inwardly toward said indentations, and a jaw actuator supported upon said frame mechanically coupled to each of said plates for opening and closing said pairs of jaws.

7. A carrier for handling leaded electrical components of differing sizes and configurations comprising a frame, a plurality of spaced pairs of jaws mounted upon said frame, each of said pairs of jaws being adapted to open for reception of a component lead and to close tightly about a lead for retention thereof, and a sleeve open at both ends supported upon said frame for handling said carrier in gross adapted to frictionally engage a transfer member thrust therein from either end and adapted to permit the entry of said one transfer member to a depth adequate to oust another like transfer member engaged therein.

8. A carrier for handling leaded electrical components of differing sizes and configurations comprising a frame, a plurality of regularly spaced pairs of jaws mounted upon said frame, each of said pairs of jaws being adapted to open for reception of a component lead and to close tightly about a lead for retention thereof, a first means for handling said carrier in gross comprising a sleeve open at both ends supported upon said frame, adapted to frictionally engage a transfer member thrust therein from either end and to permit the entry of said one transfer member to a depth adequate to oust another like member engaged therein, and a second means for handling said carrier in gross comprising a surface presenting a positive engagement to a third transfer member acting in a direction to strip said carrier from one of said first recited members.

9. A carrier for handling leaded electrical components of differing sizes and configurations comprising a frame, a plurality of spaced pairs of jaws mounted upon said frame, each of said pairs of jaws being adapted to open for reception of a component lead and to close tightly about a lead for retention thereof, said frame having an apertured portion open at both ends for handling said carrier in gross adapted to frictionally engage a transfer member thrust therein from either end and adapted to permit the entry of said one transfer member to a depth adequate to oust another like transfer member engaged therein.

10. A carrier for handling leaded electrical components of differing sizes and configurations comprising a frame, a plurality of spaced pairs of jaws mounted upon said frame, each jaw of said pairs being movable with respect to said frame to open for reception of a component lead and to close tightly about a component lead for retention thereof, a rotatable jaw actuator supported upon said frame mechanically coupled to each of said jaws for opening and closing said pairs of jaws, and biasing means tending to close said pairs of jaws.

11. A carrier for handling leaded electrical components of differing sizes and configurations comprising a frame, a plurality of spaced pairs of jaws mounted upon said frame, each of said pairs being adapted to open for reception of a component lead and to close tightly about a component lead for retention thereof, the corresponding jaws on one side of all of said pairs of jaws being comprised of a plate containing a plurality of spaced teeth and the corresponding jaws on the other side of all of said pairs of jaws being comprised of a plate containing a plurality of spaced teeth, each of said plates being movably supported upon said frame and a rotatable jaw actuator supported upon said frame having a cam mechanically coupled to each of said toothed plates for causing relative translation between said toothed plates to open and close said pairs of jaws.

12. A carrier for handling leaded electrical components of differing sizes and configurations comprising a frame, a plurality of spaced pairs of jaws mounted upon said frame, a first jaw element of each of said pairs of jaws being formed into an integral unit of insulating material, a second jaw element of each of said pairs of jaws being formed into a second integral unit of insulating material, each of said pairs of jaws being adapted to open for reception of a component lead and to close tightly about a component lead for retention thereof, a jaw actuator mechanically coupled to each of said units for opening said pairs of jaws, and biasing means tending to close said pairs of jaws.

13. A carrier for handling leaded electrical components of differing sizes and configurations comprising a frame, a plurality of spaced pairs of jaws mounted upon said frame, each of said pairs of jaws being adapted to open for reception of a component lead and to close tightly about a component lead for retention thereof, the corresponding jaws on one side of all of said pairs of jaws being comprised of a plate of insulating material, movably supported upon said frame containing a plurality of spaced teeth and the corresponding jaws on the other side of all of said pairs of jaws being comprised of a plate of insulating material, movably supported upon said frame containing a plurality of spaced teeth, and a jaw actuator for opening and closing said pairs of jaws mechanically coupled to each of said plates for effecting equal translational displacements thereto.

14. A carrier for handling leaded electrical components of differing sizes and configurations comprising a frame, a plurality of spaced pairs of jaws mounted upon said frame, each of said pairs being adapted to open for reception of a component lead and to close tightly about a component lead for retention thereof, the lead holding surfaces of said jaws being provided with V-shaped indentations for retaining leads of various diameters at a fixed position with respect to said frame along one axis, and means displacing said jaws in equal and opposite amounts along a second axis in gripping leads of various diameters whereby the centers of the leads are retained in a constant position with respect to said frame regardless of lead diameter.

15. A carrier for handling leaded electrical components of differing sizes and configurations comprising a frame, a plurality of spaced pairs of jaws mounted upon said frame, each of said pairs being adapted to open for reception of a component lead and to close tightly about a component lead for retention thereof, and means for retaining said jaws displaced in equal and opposite amounts when closed tightly about a lead whereby the centers of the leads are retained in a constant position with respect to said frame along one axis regardless of lead diameter.

References Cited in the file of this patent

UNITED STATES PATENTS

| | | |
|---|---|---|
| 746,922 | Chapin | Dec. 15, 1903 |
| 1,221,584 | Patrick | Apr. 3, 1917 |
| 1,530,939 | Hawks | Mar. 24, 1925 |
| 2,592,017 | Engstrom | Apr. 8, 1952 |